US007383263B2

(12) United States Patent
Goger (10) Patent No.: US 7,383,263 B2
(45) Date of Patent: Jun. 3, 2008

(54) CONTROLLING ACCESS TO ELECTRONIC DOCUMENTS

(75) Inventor: Karl Goger, Fussgoenheim (DE)

(73) Assignee: SAP Aktiengesellschaft, Walldorf (DE)

( * ) Notice: Subject to any disclaimer, the term of this patent is extended or adjusted under 35 U.S.C. 154(b) by 498 days.

(21) Appl. No.: 10/722,373

(22) Filed: Nov. 25, 2003

(65) Prior Publication Data

US 2004/0133849 A1    Jul. 8, 2004

(30) Foreign Application Priority Data

Nov. 29, 2002  (EP) .................................. 02026654

(51) Int. Cl.
*G06F 17/30* (2006.01)
*G06F 17/00* (2006.01)
*G06N 5/02* (2006.01)
(52) U.S. Cl. ............................................. 707/9; 706/47
(58) Field of Classification Search .............. 707/1–10, 707/100–104.1, 200–205
See application file for complete search history.

(56) References Cited

U.S. PATENT DOCUMENTS

| 5,651,101 | A | * | 7/1997 | Gotoh et al. .................... 706/53 |
| 5,933,498 | A | | 8/1999 | Schneck et al. ................. 380/4 |
| 5,982,891 | A | | 11/1999 | Ginter et al. .................... 380/4 |
| 5,991,709 | A | | 11/1999 | Schoen ............................ 704/1 |
| 6,073,242 | A | | 6/2000 | Hardy et al. .................. 713/201 |
| 6,092,090 | A | | 7/2000 | Payne et al. ................. 707/530 |
| 6,158,010 | A | | 12/2000 | Moriconi et al. | |
| 6,236,996 | B1 | | 5/2001 | Bapat et al. ..................... 707/9 |
| 6,237,099 | B1 | | 5/2001 | Kurokawa .................... 713/200 |
| 6,314,409 | B2 | | 11/2001 | Schneck et al. ............... 705/54 |
| 6,599,324 | B2 | * | 7/2003 | Saito et al. .................. 715/513 |
| 2002/0040370 | A1 | | 4/2002 | Entwistle ..................... 707/205 |
| 2002/0109707 | A1 | | 8/2002 | Lao et al. .................... 345/700 |
| 2002/0112164 | A1 | | 8/2002 | Schmelig et al. ........... 713/176 |

FOREIGN PATENT DOCUMENTS

WO    WO 02/14987 A2    2/2002

OTHER PUBLICATIONS

European Search Report issued in EP 02026654.0 - 1245, dated Jan. 5, 2004, 3 pages.
Notification of Transmittal of the International Search Report or the Declaration, PCT/ISA/220; and International Search Report, Form PCT/ISA/210 issued in PCT/EP03/12705, mailed May 21, 2004, 7 pages.
Communication pursuant to Article 96(2) EPC, issued in EP 02026654.0 - 1245, dated May 12, 2007, 6 pages.

* cited by examiner

*Primary Examiner*—Alam Hosain
*Assistant Examiner*—Navneet K Ahluwalia
(74) *Attorney, Agent, or Firm*—Fish & Richardson P.C.

(57) ABSTRACT

Methods and apparatus, including computer program products, for protecting electronic documents. A computer system includes a repository for storing an electronic document that has a document attribute. An access layer is used by an accessor to access at least one portion of the electronic document. The accessor has an accessor attribute. An expert system is operable to determine an access behavior with regards to the at least one portion by evaluating rules of a rule set with reference at least to the document attribute and the accessor attribute when the accessor tries to access the at least one portion using the access layer.

30 Claims, 6 Drawing Sheets

CONTROLLING ACCESS TO ELECTRONIC DOCUMENTS

CROSS-REFERENCE TO RELATED APPLICATIONS

Under 35 U.S.C. § 119, this application claims the benefit of a foreign priority application filed in the European Patent Office under EP 02026654.0, on Nov. 29, 2002. The disclosure of the above application is incorporated herein by reference in its entirety.

BACKGROUND

The present invention relates to electronic data processing in general, and particularly to data protection.

In organizations, computer systems are used to protect many electronic documents of various types. The computer systems may be used to perform business processes. Typically, access rights of processes (e.g., business processes) or users often change over time because:

a) people change job and responsibility within an organization; or b) an organization itself changes its processes (e.g., by process reengineering) and/or organizational structure changes; or c) each of multiple organizations has different requirements on document access (or document security) with respect to the same type of document depending on organization-specific job descriptions and/or specific organizational structures; or d) new documents are developed which must be easily integrated into an existing computer system without the need to develop a new access control mechanism and/or a user-specific document presentation logic for each new type of document.

SUMMARY OF THE INVENTION

One aspect of the invention provides protection of electronic documents by deriving attributes of electronic documents and incorporating those attributes into rules, in concert with accessor attributes, for allowing or denying access to the electronic documents.

One embodiment of the invention provides an authorization system for protecting electronic documents against unauthorized access by using authorization information that is provided by an expert system that operates on top of a knowledge base. The knowledge base includes information that can include available document types, document structure meta data, document rules, user names, roles (or company job descriptions), or providers of electronic documents.

It is an effect of particular implementations of the present invention that the knowledge base and, therefore, the authorization system can be enhanced/changed by adding or changing rules that use document attributes and accessor attributes without changing any application code in the implementation of the presentation logic of the electronic document.

It is a further effect of particular implementations of the invention that the expert system can inspect the documents and document content through a generic interface where the expert system learns about the document and the document structure meta data or other document attributes so that the number of rules is not limited to any number, such as the number of hard coded rules. For example, rules can be based on the document structure meta data and/or any combination of further rules available in the knowledge base.

It is a further effect of particular implementations of the invention that, because the access logic is kept separate from the document and user definitions, making a change to the knowledge base affects all documents substantially simultaneously without a need for modifying any document or user definition.

The aspects of the invention will be realized and attained by means of the elements and combinations particularly pointed out in the appended claims. It is to be understood that both the foregoing general description and the following detailed description are exemplary and explanatory only and are not restrictive of the invention.

DETAILED DESCRIPTION

Figure 1:
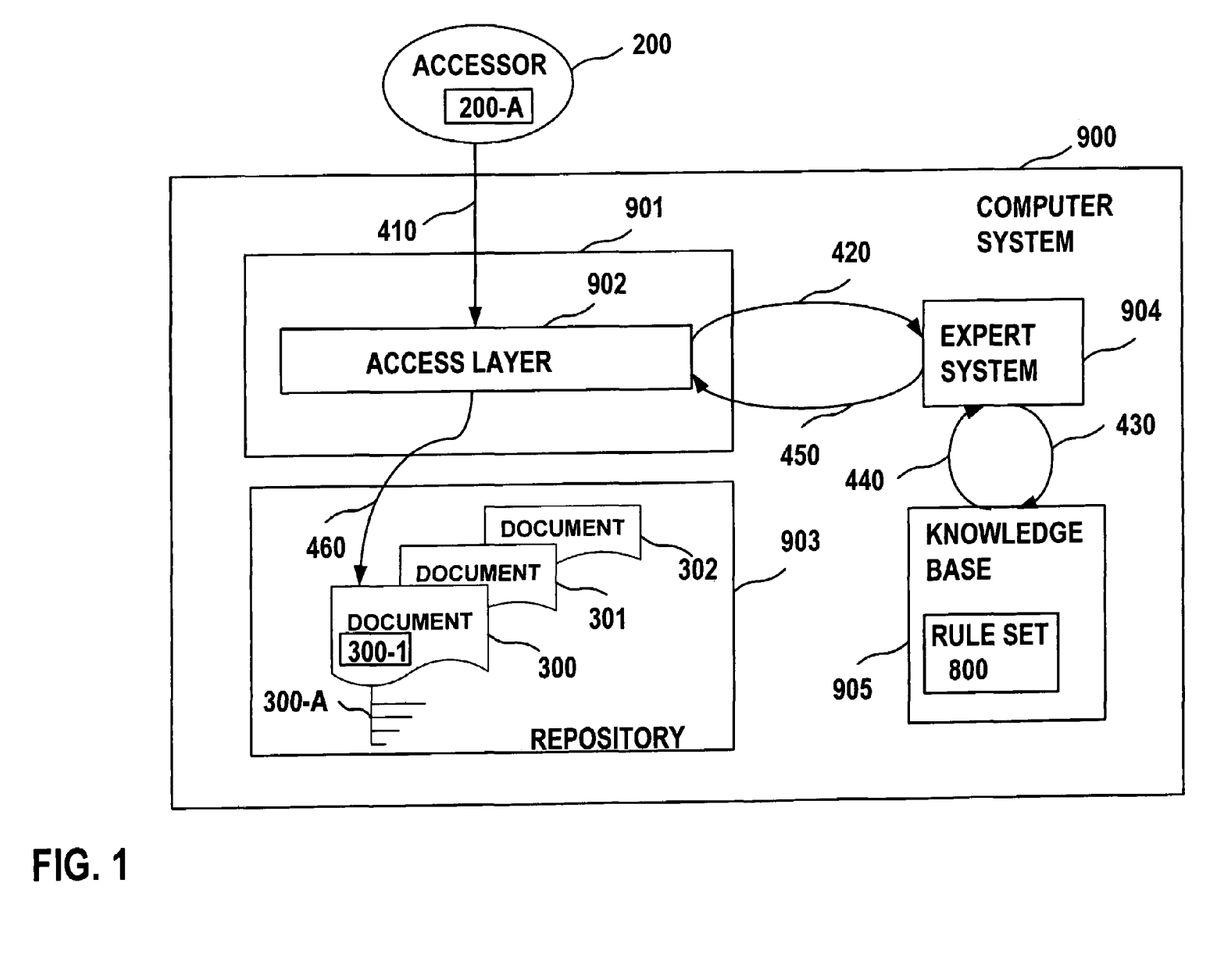
FIG. 1 is a simplified block diagram of a computer system that can be used with one embodiment of the invention to control access to an electronic document.

FIG. 1 is a simplified block diagram of a computer system 900 that can be used with one embodiment of the invention to control access to electronic documents. An electronic document is a set of data that is electronically stored and retrievable. Examples of electronic documents include: a text document, address data of an individual or an organization, an accounting voucher, a production order or any kind of digital data object, e.g., a Word document, an XML document, some Java code, a data object from an object oriented database, and so on. Electronic documents will be referred to as documents in the following description.

The architecture of the computer system 900 defines a closed system, in the sense that an accessor's 200 access to a document (e.g., document 300, 301, 302) or to at least one portion 300-1 of the document is only through a framework 901, and more particularly, through an access layer 902 that is part of the framework 901.

The access layer 902 evaluates authorization information provided by an expert system 904 on request 420. For example, the authorization information includes an access behavior of the document and/or information about the structure of the document (e.g., document portions, nested documents). As determined by the authorization information, the access layer 902 allows or disallows the accessor to access 460 the document 300 or portion 300-1. The access behavior can be different for different accessors.

According to the type of the accessor (e.g., user, process, application), the accessor can have attributes 200-A, such as user role, user group, process type or application type. In one implementation, the accessor attribute(s) are stored in data structures used for user role definitions as available in the R/3 system or in the mySAP Enterprise Portal of SAP AG (Walldorf, Germany). In case a user uses an application to access a document, the accessor can be considered as a two-dimensional combination of the user and the application and, therefore, the accessor attributes can also be combinations of multiple one-dimensional accessor attributes. For example, a two-dimensional accessor attribute can be a combination of a corresponding user role attribute and the corresponding application type. This is true for any multi-dimensional accessor.

The documents are stored in a repository 903. For example, a document may be stored in a central cache. In the framework 901, each type of document can implement a generic interface (in the Java sense of 'interface', a collection of method definitions, declared constants, or both) that the access layer 902 can use to learn characteristics of the document, for example, document attributes. Generic interface refers to an interface that is common to all documents of the framework. The generic interface enables the framework to access fields, attributes or portions and paragraphs of a document and to retrieve the corresponding values. In another implementation, the invention can also be used with dumb documents in combination with a repository of metadata that provides attributes of the dumb documents. In another implementation, the invention can also be used with self describing documents, such as XML documents or JAR files or PDF files, in combination with an external metadata repository and external methods for providing attribute information for the framework.

In the example, document 300 has a document attribute 300-A. Examples of document attributes are document type, document structure information, document meta data, document relationship information or document access behavior.

What a particular accessor 200 can see and do with respect to a particular document 300 or a portion 300-1 of the document is determined by an expert system 904 based on accessor attributes 200-A, document attributes 300-A, and rules of a rule set 800. If the document has no structure, the portion 300-1 and the document 300 can be considered to be identical. In other words, the expert system 904 determines an access behavior with regards to the document 300 or portion 300-1 by evaluating rules of a rule set 800 when the accessor 200 tries to access the document 300 or one of its portions (e.g., portion 300-1) by using 410 the access layer 902. The rules reference at least to the document attribute 300-A and the accessor attribute. Examples of access behaviors applicable to any type of document and document granularity (e.g., whole document, portion, child document) are:

a) hidden (the document is hidden), b) protected (the accessor may learn that there is a document, but can not access the content), c) read (the accessor may view the document but not to change the content), d) modify (the accessor may make changes to the content), e) delete (the accessor may delete the document), f) create (the accessor may create a document of a specific type), and g) print (the accessor may print the document).

Further access behaviors can be defined, such as, for example:

h) copy (the accessor may create a copy of the document), i) transport (the accessor may transport the document to a different data processing system), j) archive (the accessor may send the document to an archive), and k) others, where the access logic can be enhanced by using information from the expert system. For example, custom access behaviors can be defined as methods of the corresponding documents. For example, documents can be classes, e.g., Java classes, and access to and use of classes (program components) can be controlled.

When the accessor 200 modifies a document, the expert system 904 can track each modification with respect to access violations. In case of an access violation, the expert system optionally can inform the accessor by, for example, sending a message, such as "Please change vacation dates during regular working hours only", or "You are not responsible for the selected customer", if the accessor is a human user.

While an accessor is modifying a document, the access layer can retrieve allowed document attribute values or combinations of such values from the expert system depending on the document type, the rules and the already existing content of the document. In other words, by calculating allowed values for which the accessor has authorization, the expert system provides information that the access layer can use to guide the accessor when modifying a document. In an example case, a human resource management clerk in an organization is entitled to process employee data for all employees where the last name starts with letters in the range from "G" to "M". In this case, when the clerk uses a possible-entries help function for an input field of a corresponding human resource application, the system will only provide the names of employees starting with a letter within the value range that can be processed by the clerk according to his/her authorization. The access layer can provide values to a user interface layer in accordance with an access behavior by using the expert system and the knowledge base.

Once the access behavior is determined, the expert system 904 returns 450 the access behavior to the access layer 902, which will control the access of the accessor accordingly. A knowledge base 905 can include the definitions of the access behaviors.

Further, the rule set 800 can be implemented in the knowledge base 905. The rules can come from providers or owners of the documents in the system. For example, the rule set 800 includes rules that use the accessor attribute 200-A and the document attribute 300-A to assert that certain conditions, when true, lead to certain conclusions. The truth of the conditions is determined on the basis of the accessor and document attribute values. The result of the rule evaluation is a conclusion about the access behavior of the accessor relative to the document or to a portion of the document.

Further, the knowledge base 905 can include information about users, information about documents, and meta data information about document structures and document types. The user information can include role attributes for particular users. The document structure information, for example, can include information that a text document can have styles public and private, and a rule of the rule set 800 can define different access behaviors (e.g., permissions to read) to users with different roles.

For example, the expert system 904 checks document attributes, for example, the document type, document structure or document content, depending on information specified in the knowledge base 905, by accessing 430 meta data of the corresponding document type through a further generic interface. Then, the expert system 904 retrieves 440 the corresponding information (e.g., user information, document types, document meta data, document relations, access behavior definitions or rules) from the knowledge base 905 for determining the access behavior.

For example, the document structure information can allow the document 300 to include document portions or nested documents, and the permission rules can allow access to an inner portion 300-1 or nested document while disallowing access to an outer portion or the enclosing document.

Because all access occurs through the access layer 902, it is possible to change the presentation of the document 300 (e.g., on a display or printout) depending on the authorization information from the expert system in conjunction with the access layer. For example, when a sales clerk calls a sales turnover report document, the clerk may only be authorized to see the monthly turnover of his/her own customers. However, when the clerk's manager calls the same report document, he/she may see a document including multiple portions for various employees of the sales department.

The knowledge base 905, expert system 904, repository 903 and the framework 901 can all be implemented in one computer system as shown in FIG. 1 but can also be implemented in multiple computer systems that can communicate, for example, over a network.

Figure 2A:
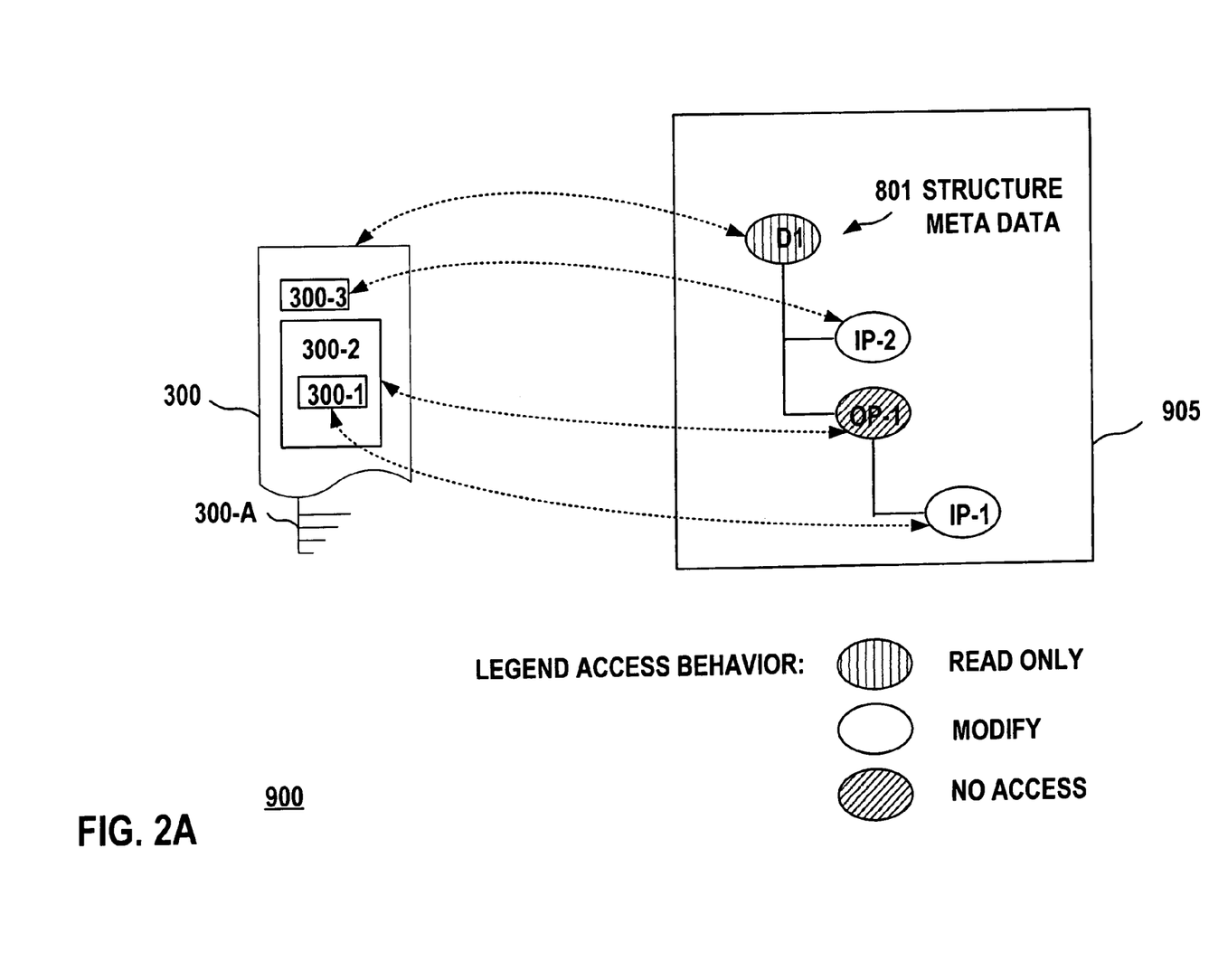
FIG. 2A illustrates structure meta data for the electronic document.

FIG. 2A illustrates structure meta data 801 for the document 300.

For example, in a first embodiment, the document 300 includes two sub-portions 300-2, 300-3. The sub-portion 300-2 is an outer portion 300-2 that further includes the inner portion 300-1. In a second embodiment, the sub-portions are replaced by nested (child) documents that are included by reference. For convenience of explanation, the following description is based on the first embodiment but is also true for the second embodiment or any mix of the first and second embodiments.

Structure meta data 801 reflects the structure of document 300. For this example, the structure meta data is stored in the knowledge base 905. Dashed double arrows in the figure indicate which portion of the structure meta data 801 corresponds to which portion of the document 300. Document 300 can have a document type that is assigned to the corresponding structure element D1 in the structure meta data 801. The structure element OP-1 corresponds to the outer portion 300-2. The structure elements IP-1, IP-2 correspond to the inner portions 300-1, 300-3, respectively.

A specific access behavior can be applied to a document as a whole or to portions of the document. The same is true for a nested (child) document of the document and portions of the child document. Each portion/child document can have an access behavior that is different from that of the document including the portion/child document. The access behavior of a portion/child document can assign more rights to an accessor than does the access behavior of the (outer parent) document that includes the portion/child document. In the example of FIG. 2, the access behavior for the structure element D1 is 'READ ONLY'. However, the access behavior for the outer portion structure element OP-1 is 'NO ACCESS', whereas the access behavior for the inner portion structure element IP-1 (and the inner portion IP-2 structure element) is 'MODIFY'. In other words, the access to the inner portion can be controlled so that the document can be accessed by a reader, for example, in a 'read only' mode, whereas the access to the outer portion is prohibited but the inner portion 300-1 of the outer portion 300-2 can be accessed in a 'change' or 'modify' mode. With respect to the inner portion 300-3, document 300 itself can be considered as the outer portion.

Figure 2B:
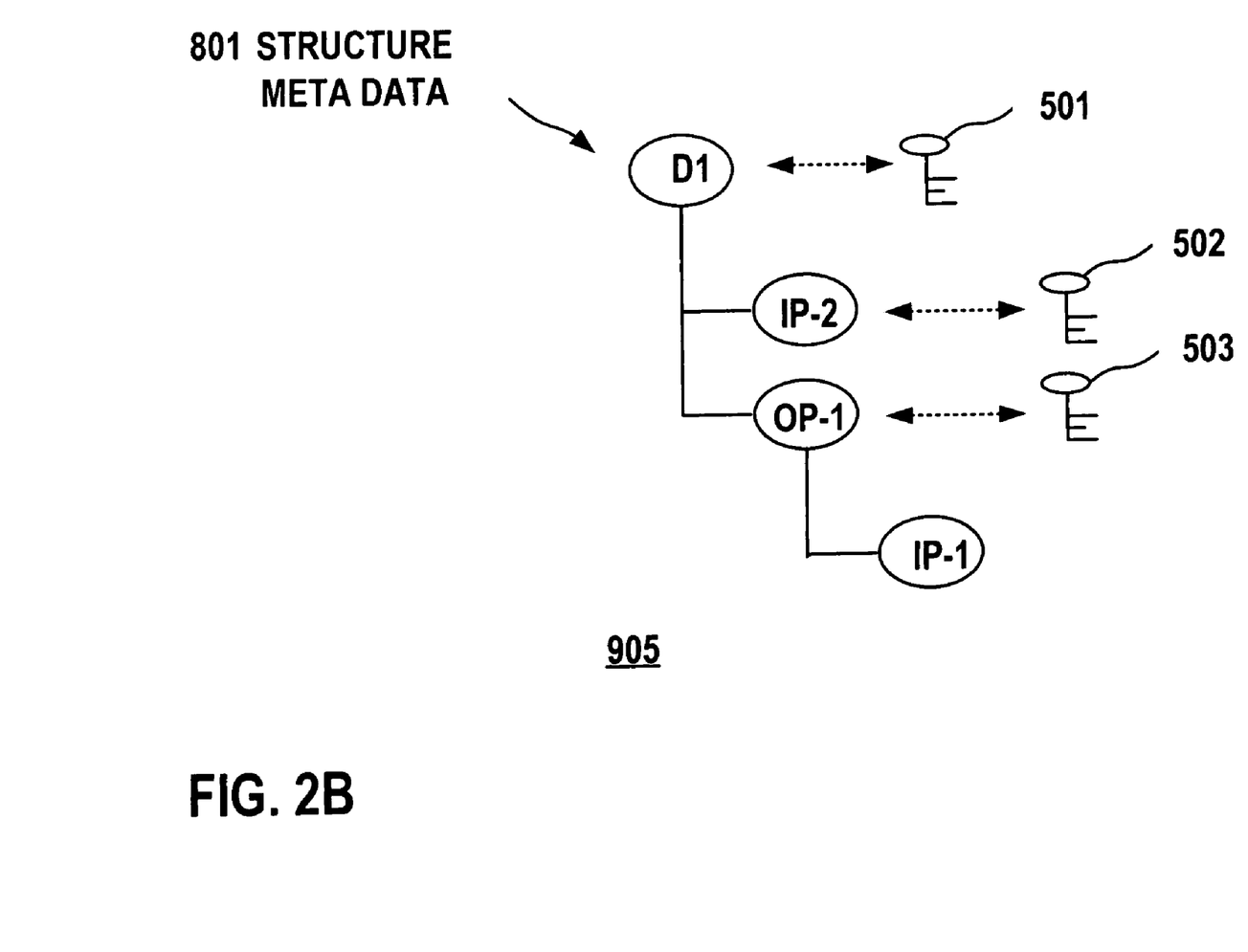
FIG. 2B illustrates keys that relate to the structure meta data.

FIG. 2B illustrates keys that relate to the structure meta data 801.

A key can be associated (illustrated by dashed double arrows) with a structure element in the structure meta data 801. For example, structure elements D1, IP-2 and OP-1 are associated with keys 501, 502 and 503, respectively.

The key bit (tooth of the key) of each key can be considered as a part of the access behavior for the associated structure element. A key can have a sub-key defining a more restrictive access behavior than the key itself. For example, a key can allow access to all zip codes complying with the mask "6**", whereas a first sub-key of the key allows access to all zip codes complying with the mask "69*" and a second sub-key allows access to all zip codes complying with the mask "67*". The first sub-key can have a further sub-key that allows access to all zip codes complying with the mask "695" only, and so on.

Instead of using fixed values for defining a key, the key can also be generically defined by using parameters whose values are automatically determined by the expert system at runtime.

In case a child structure element IP-2 corresponds to a portion of its parent D1, the child structure element can have its own key 502 or inherit the key 501 of its parent D1. In case the child structure element corresponds to another (child) document that is included in the structure meta data by reference, the included (child) document has its own key.

By associating a key with a structure element of the structure meta data 801, any access behavior granularity can be achieved with regards to the document, portion or child-document corresponding to the structure element.

Figure 3A:
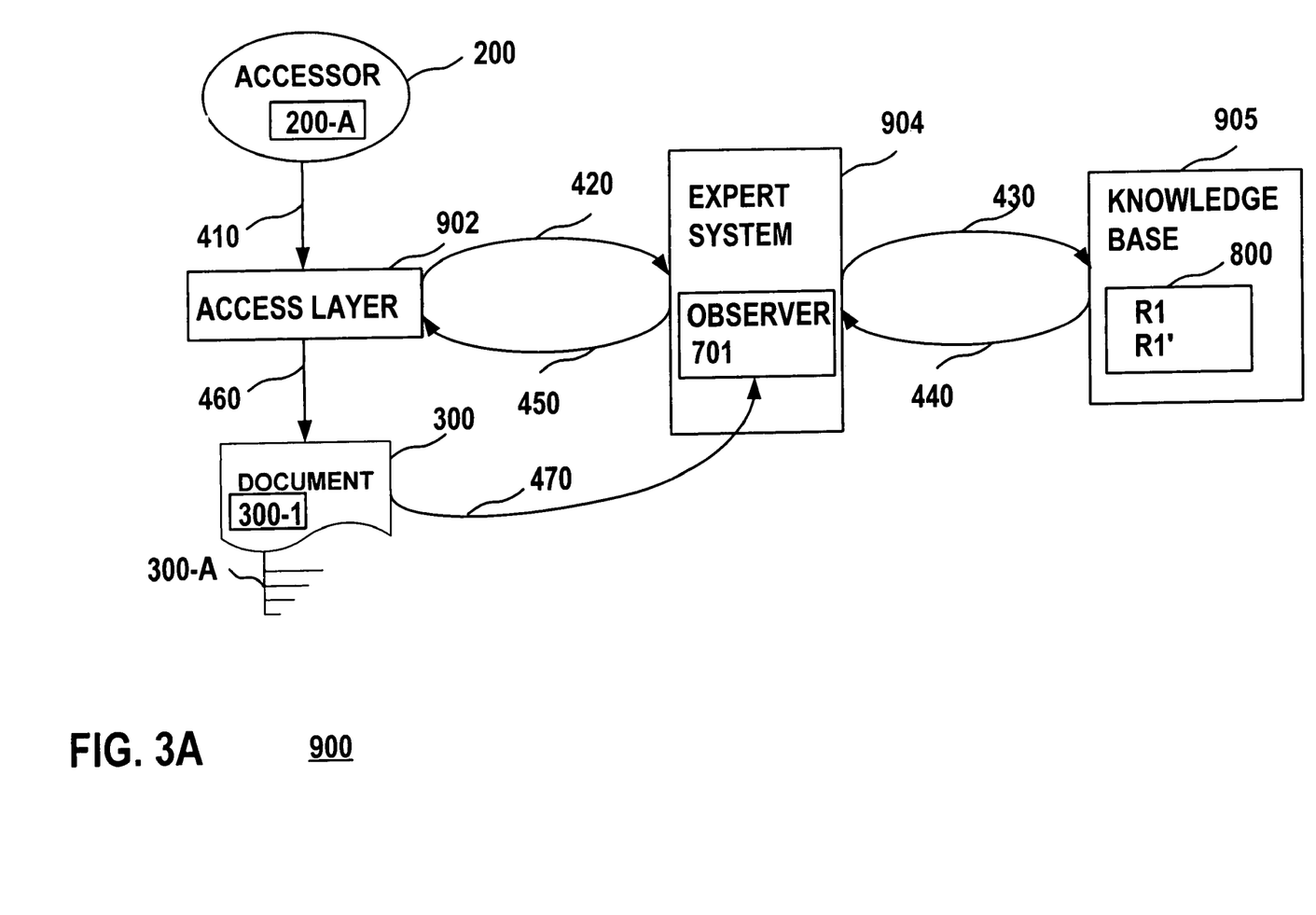
FIG. 3A illustrates how an observer is used to control access to the electronic document while it is edited.

FIG. 3A illustrates how an observer is used to control access to a document while it is edited.

As explained in reference to FIG. 1, the access layer 902 allows the accessor 200 to access 460 either a portion 301 or the whole document 300. For example, rule R1 is used by the expert system to determine the appropriate access behavior. In case the access behavior allows the accessor to modify the document 300 or any portion of the document, an observer 701 can track events that are raised 470 by the document 300 or by a runtime representation of the document that is specific to the accessor. This runtime representation will be referred to as a container. When an accessor gets access to the document, the framework 901 generates a corresponding container that references the document, so that, for example, the accessor can modify the document through the container. The container reflects the access behavior of the accessor with respect to the document. That is, although the container knows the full structure of the document, it restricts the accessor's view in accordance with the access behavior. Because the container knows the full structure of the document, it can detect an access violation whenever the accessor tries to access portions of the document that are not permitted or when the accessor tries to perform an action that does not comply with the access behavior.

In a multi-accessor environment, the document 300 can be simultaneously accessed by multiple accessors with various access behaviors through corresponding containers all referencing the same document. The document can be stored in a central cache.

For example, the observer 701 of the document 300 can be implemented as a runtime component of the expert system 904 or of the framework 901. In one embodiment, each document has a corresponding observer. In another embodiment, one observer can be used, for example, for multiple documents (e.g., documents having the same document type). The observer 701 receives an event directly from the document 300 or from a corresponding container without going through the access layer 902. When the observer 701 receives the event because, for example, the content of the document has been modified, the expert system 904 can track the modification (e.g., by using a corresponding document attribute 300-A) and use a different rule R' from the rule set 800 to determine an appropriate access behavior that can be different from the access behavior that was applied prior to the modification. For example, an access behavior "READ ONLY" can be determined and immediately be applied by the access layer to the current accessor 200 with respect to the document 300 or portion 300-1 and the corresponding container. In case of multiple accessors working through further corresponding containers on the same document 300, the observer 701 of the document notifies any of the further corresponding containers about the changes so that the change becomes effective for any accessor that processes the document at that moment.

Consider as an example a document that is a purchase order stored in a central cache of an enterprise resource planning (ERP) system. The purchase order can include multiple purchase items (e.g., document portion 300-1). The document attribute 300-A can be a document status that indicates whether or not the purchase order includes open purchase items. Further, the purchase order can have a method that changes the document status 300-A from "open" to "closed" as soon as all purchase items are "closed". An accessor who modifies the document by closing the last open purchase item of the document triggers the corresponding modification of the document status 300-A from "open" to "closed". The document raises 470 a corresponding event that is received by the corresponding observer 701. The observer 701 causes the expert system to retrieve an appropriate updated access behavior by using a rule (e.g., rule R1') that applies when the corresponding document has attribute value "closed" (instead of the previous value "open" that relates to a different rule, such as rule R1). For example, the appropriate updated access behavior can be "READ ONLY". When providing the "READ ONLY" access behavior to the access layer 902, the access layer immediately takes away from the accessor all permissions that allow the accessor to further modify the content of the document or of any document portion. The remaining permissions only allow the accessor to view the content of the document. That is, the accessor, although not having left the session for editing the document, suddenly is not in a position to apply further modifications to the document.

Figure 3B:
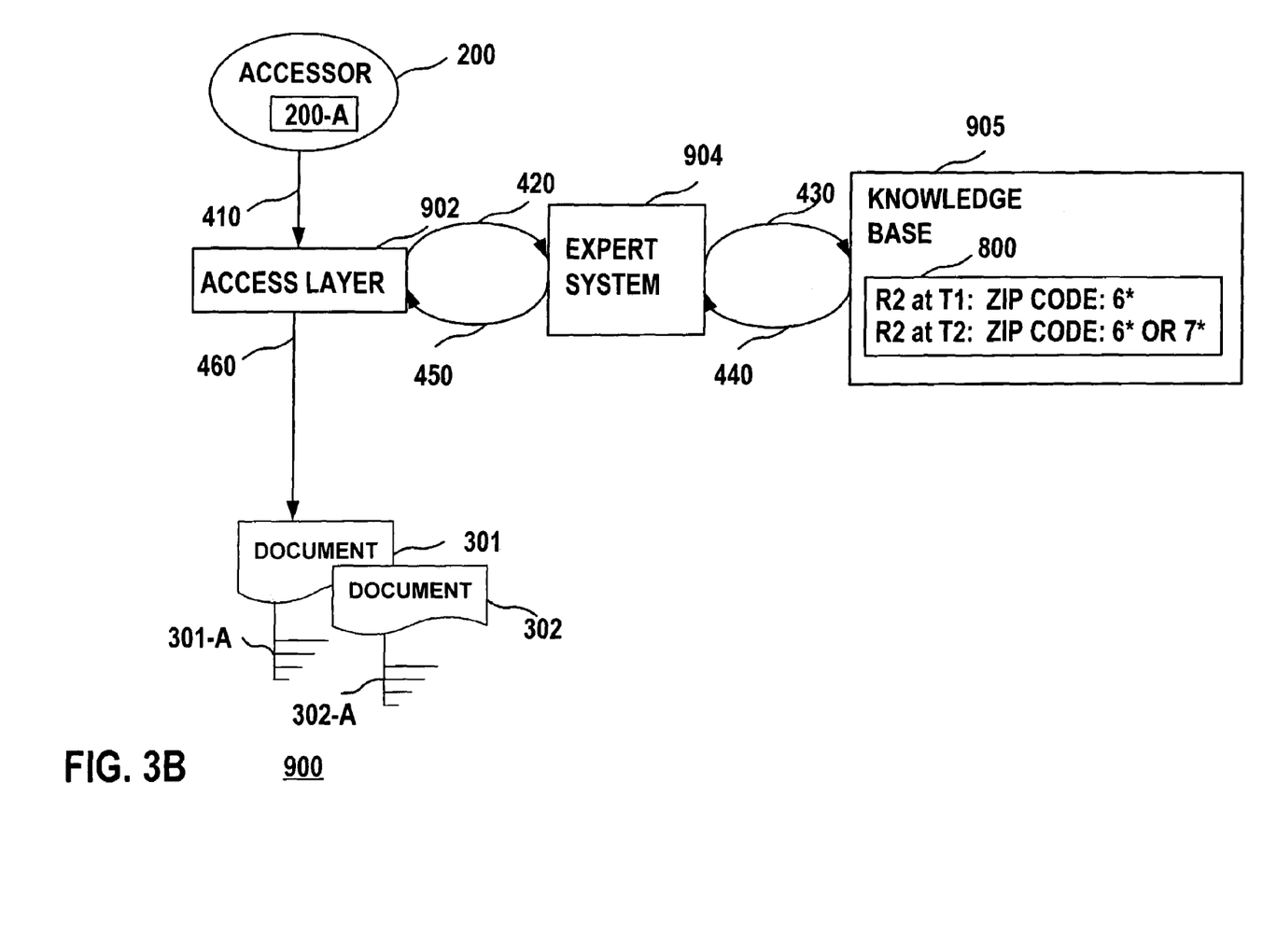
FIG. 3B illustrates how the access behavior for an accessor in accessing the electronic document can be changed simultaneously for all documents of a specific document type.

FIG. 3B illustrates how the access behavior for an accessor in accessing a document 301 of a specific document type can be changed simultaneously for all documents 301, 302 of the specific document type.

A change of the rule set 800 can affect substantially simultaneously the access behavior of the accessor 200 relative to the document or to any document portion without the need to change the document or the accessor 200.

For example, the access layer 902 grants 460 the accessor 200 access to the document 301 having a document attribute 301-A. The corresponding access behavior is determined at the time point T1 by the expert system 904 by using the rule R2 in the rule set 800. For example, at T1, rule R2 provides that an accessor 200 with an accessor attribute 200-A having a value, such as "sales organization 1", can modify any document having a document attribute 301-A with a value, such as "customer master data", only if the zip code of a customer's address in the document 301 starts with "6" (6*).

In case the responsibility of the sales organization 1 is changed, the corresponding rule R2 can be adjusted accordingly. For example, at T2, rule R2 is adjusted to reflect that sales organization 1 now is responsible for all customers having a zip code starting with "6" or "7" (6* OR 7*). From T2 onwards any combination of accessor attributes and document attributes that leads to using rule R2 for the determination of the access behavior results in providing permissions for zip codes 6* OR 7* in the access layer.

Figure 4:
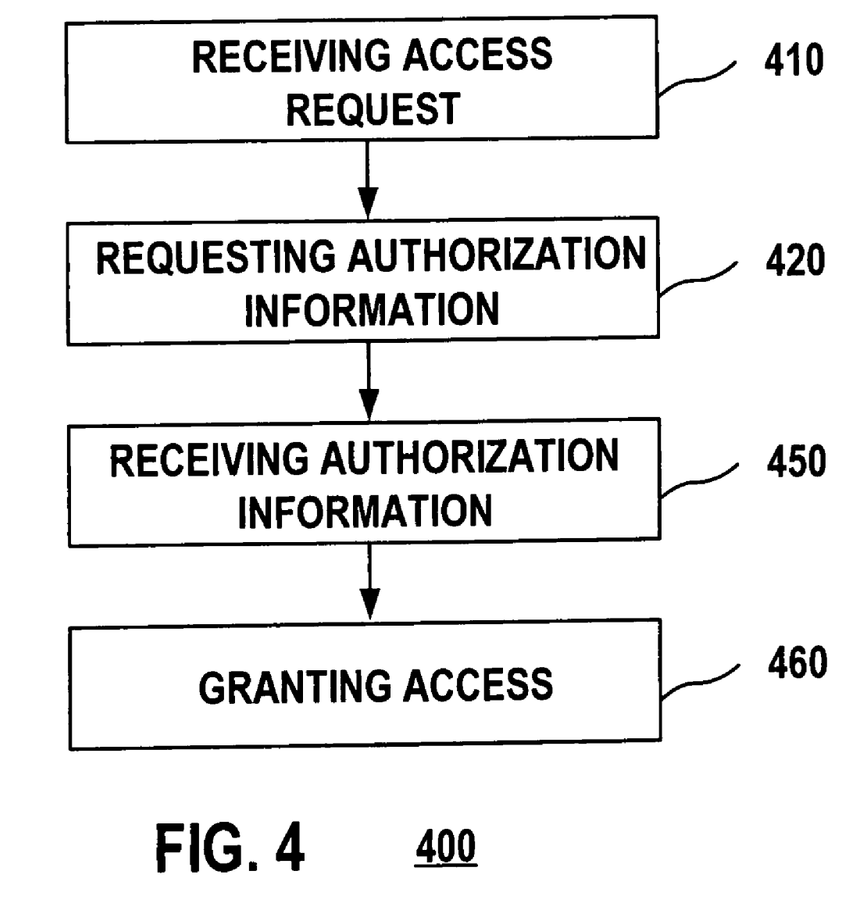
FIG. 4 is a simplified flowchart of a method for controlling access to electronic documents when used with one embodiment of the present invention.

FIG. 4 is a simplified flowchart of a method 400 for controlling access to electronic documents. The method 400 includes the steps receiving an access request 410, requesting authorization information 420, receiving authorization information 450, and granting access 460.

In the receiving step 410, an access layer 902 receives a request of an accessor 200 to access at least one portion 300-1 of a document 300 stored in a repository 903. The document has at least one document attribute 300-A. The accessor 200 has at least one accessor attribute 200-A. If the document has no structure, the at least one portion corresponds to the document itself. The access layer uses a generic interface of the document to learn about the at least one document attribute.

In the requesting step 420, the access layer requests authorization information from an expert system 904 with regards to the authorization of the accessor 200 to the at least one portion. The access layer provides the at least one document attribute and the at least one accessor attribute to the expert system. The expert system uses the attribute information for retrieving the authorization information including an access behavior from a knowledge base 904. For this, the expert system applies rules of a rule set 800 to data that includes at least the document attribute(s) and the accessor attribute(s). Besides a data driven (forward) chaining approach, a goal driven (backward) chaining approach or a mixed approach can also be used. In the forward chaining approach, the expert system first gathers all data (e.g., document and accessor attributes) before starting to evaluate the corresponding rules to determine the access behavior. In the backward chaining approach, the expert system starts with the goal (e.g., a need to change the access behavior from "READ ONLY" to "MODIFY") and evaluates by gathering the corresponding data when needed. A mixed approach can be advantageous, when forward chaining is done with all the readily available data, and if the accessor hits an access violation (e.g., when trying to perform an activity that is not allowed by the current access behavior), backward chaining is done to determine whether the access might be permissible after all.

For example, the rule set 800 can also be stored in the knowledge base. Rules of the rule set can use the accessor attribute(s) and the document attribute(s). The expert system can also retrieve document meta data from the knowledge base. For example, in case of a document with an internal structure, meta data 801 that describes the structure of the document 300 can be retrieved. For each portion of the document, the expert system can determine a specific access behavior, such as hidden, protected, read, modify, delete, create, print, copy, transport, archive, or optional custom access behaviors.

In the receiving authorization information step 450, the access layer receives from the expert system 904 the authorization information including the access behavior with regards to the at least one portion 300-1 for the accessor 200.

In the granting access step 460, the access layer 902 grants the accessor 200 access to the at least one portion 300-1 according to the access behavior. For example, if the structure meta data 801 indicates that the at least one portion is an inner sub-portion 300-1 of an outer portion 300-2 of the document 300, the access layer 902 can allow the accessor 200 to access the inner sub-portion 300-1 but prevent the accessor 200 from accessing the outer portion 300-2. The outer portion may also correspond to the whole document 300.

In case changes are applied to the rule set, these changes substantially simultaneously affect the access behavior to the at least one portion 300-1 without the need to change the document 300 or the accessor 200. Further, any other access behavior, whose determination by the expert system depends on the change, is affected immediately after the change has occurred. That is, any access to any document by any accessor is evaluated by an access control mechanism that uses the changed rule set immediately after the change has occurred.

When the accessor tries to access the document 300 or the portion 300-1, the framework 901 generates a runtime representation of the document 300 that references the document 300 and reflects the access behavior with respect to the accessor 200.

The document or the representation (container) may raise an event that is triggered by a change of the document 300. An observer 701 receives the event from the document 300 or the container and causes the expert system 904 to determine an updated access behavior in accordance with the change. Then, the observer notifies the document 300 and the container about the updated access behavior. In a multi-accessor case, each container that is connected to the document 300 is notified.

An embodiment of the present invention can be implemented by using a computer system that has at least a memory and a processor. The computer system can communicate with further computer systems over a network (e.g., a wide area network (WAN), a local area network (LAN), the Internet.) A computer program product that can be loaded into the memory of the computer system includes instructions that, when executed by the processor, cause the computer system to perform steps according to the present invention.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

The invention claimed is:

1. A computer system for protecting electronic documents, comprising:
   a repository for storing an electronic document having a document attribute;
   an access layer operable to control access to the electronic document, wherein the access layer is used by an accessor to access at least one portion of the electronic document, the accessor having an accessor attribute;
   a rule set;

an expert system, wherein the expert system provides authorization information to the access layer in response to a request, and wherein the expert system is operable to determine the authorization information comprising an access behavior with regards to the at least one portion, and wherein the expert system determines access behavior by evaluating rules of the rule set with reference to at least the document attribute and the accessor attribute when the accessor tries to access the at least one portion using the access layer; and a framework, the framework generating a runtime representation of the document that references the document and restricts the access of the accessor to the document in accordance with the access behavior.

2. The computer system of claim 1, where the rule set is stored in a knowledge base and the access behavior is defined in the knowledge base.

3. The computer system of claim 1, where the expert system returns the access behavior to the access layer to control the access of the accessor.

4. The computer system of claim 1, where the rule set has a rule that uses the accessor attribute and the document attribute to assert a condition on the basis of a value of the accessor attribute and a value of the document attribute.

5. The computer system of claim 1, where the access layer utilizes a generic interface implemented by the document to access the document attribute from the document.

6. The computer system of claim 5, where the expert system utilizes the generic interface implemented by the document to retrieve structure meta data of the document that describes the structure of the document.

7. The computer system of claim 6, where the structure meta data indicates that the at least one portion is an inner subportion of an outer portion of the document and the access layer allows the accessor to access the inner subportion but prevents the accessor from accessing the outer portion.

8. The computer system of claim 6, where the structure meta data has at least one structure element that is associated with a key that influences the access behavior for the at least one structure element.

9. The computer system of claim 1, where at least one of:
the document attribute comprises at least one of document type, document structure information, document meta data, document relationship information, and document access behavior;
the accessor attribute comprises at least one of user role, user group, process type, and application type;
the access behavior comprises at least one of hidden, protected, read, modify, delete, create, print, copy, transport, archive, and custom access behavior; and
the accessor comprises at least one of user, application, and process.

10. The computer system of claim 1, where a change of the rule set affects substantially simultaneously the access behavior to the at least one portion without the need to change the document or the accessor.

11. A method for controlling access to electronic documents, comprising:
receiving a request from an accessor to access at least one portion of an electronic document stored in a repository, with the electronic document having a document attribute and the accessor having an accessor attribute;
requesting authorization information from an expert system with regards to the authorization of the accessor to the at least one portion in response to receiving the request;
receiving from the expert system the authorization information including an access behavior with regards to the at least one portion, where the access behavior is determined by applying rules of a rule set to data comprising at least the document attribute and the accessor attribute;
generating a runtime representation of the document that references the document and restricts the access of the accessor to the document in accordance with the access behavior; and
granting the accessor access to the at least one portion according to the access behavior.

12. The method of claim 11, where the access behavior is defined in a knowledge base and the rule set is stored in the knowledge base.

13. The method of claim 11, where the rule set has a rule that uses the accessor attribute and the document attribute to assert a condition on the basis of a value of the accessor attribute and a value of the document attribute.

14. The method of claim 11, further comprising:
receiving an event raised by the document or raised by the runtime representation, where the event is triggered by a change of the document;
causing the expert system to determine an updated access behavior in accordance with the change; and
notifying at least one of the document and the runtime representation about the updated access behavior.

15. The method of claim 11, where the access behavior comprises at least one of hidden, protected, read, modify, delete, create, print, copy, transport, archive, and custom access behavior.

16. The method of claim 11, further comprising:
changing the rule set and affecting substantially simultaneously the access behavior to the at least one portion without the need to change the document or the accessor.

17. A computer program product, tangibly embodied on a machine readable storage medium, comprising instructions operable to cause a data processing apparatus to:
receive a request from an accessor to access at least one portion of an electronic document stored in a repository, with the electronic document having a document attribute and the accessor having an accessor attribute;
request authorization information from an expert system with regards to the authorization of the accessor to the at least one portion in response to receiving the request;
receive from the expert system the authorization information including an access behavior with regards to the at least one portion, where the access behavior is determined by applying rules of a rule set to data comprising at least the document attribute and the accessor attribute;
generate a runtime representation of the document that references the document and restrict the access of the accessor to the document in accordance with the access behavior; and
grant the accessor access to the at least one portion according to the access behavior.

18. The product of claim 17, where access to the at least one portion of the electronic document is provided only through an access layer comprising the instructions to receive a request, request authorization, receive from the expert system authorization information, and grant the accessor access.

19. The product of claim 17, where the access behavior is defined in a knowledge base and the rule set is stored in the knowledge base.

20. The product of claim 17, where the rule set has a rule that uses the accessor attribute and the document attribute to assert a condition on the basis of a value of the accessor attribute and a value of the document attribute.

21. The product of claim 17, wherein the instructions are further operable to:
receive an event raised by the document or raised by the runtime representation, where the event is triggered by a change of the document;
cause the expert system to determine an updated access behavior in accordance with the change; and
notify at least one of the document and the runtime representation about the updated access behavior.

22. The product of claim 17, where the access behavior comprises at least one of hidden, protected, read, modify, delete, create, print, copy, transport, archive, and custom access behavior.

23. The product of claim 17, wherein the instructions are further operable to:
change the rule set and affecting substantially simultaneously the access behavior to the at least one portion without the need to change the document or the accessor.

24. A method for controlling access to electronic documents, the method comprising:
receiving a request from an accessor to access at least one portion of an electronic document stored in a repository, with the electronic document having a document attribute and the accessor having an accessor attribute;
requesting authorization information from an expert system with regards to the authorization of the accessor to the at least one portion in response to receiving the request;
receiving from the expert system the authorization information including an access behavior with regards to the at least one portion, where the access behavior is determined by applying rules of a rule set to data comprising at least the document attribute and the accessor attribute;
retrieving structure meta data of the document that describes the structure of the document, where the structure meta data indicates that the at least one portion is an inner sub portion of an outer portion of the document; and
granting the accessor access to the at least one portion according to the access behavior, where granting the accessor access further comprises:
allowing the accessor to access the inner sub portion; and
preventing the accessor from accessing the outer portion.

25. The method of claim 24, where the rule set has a rule that uses the accessor attribute and the document attribute to assert a condition on the basis of a value of the accessor attribute and a value of the document attribute.

26. The method of claim 24, further comprising:
changing the rule set and affecting substantially simultaneously the access behavior to the at least one portion without the need to change the document or the accessor.

27. A computer program product, tangibly embodied on a machine readable medium, comprising instructions operable to cause a data processing apparatus to:
receive a request from an accessor to access at least one portion of an electronic document stored in a repository, with the electronic document having a document attribute and the accessor having an accessor attribute;
request authorization information from an expert system with regards to the authorization of the accessor to the at least one portion in response to receiving the request;
receive from the expert system the authorization information including an access behavior with regards to the at least one portion, where the access behavior is determined by applying rules of a rule set to data comprising at least the document attribute and the accessor attribute;
retrieve structure meta data of the document that describes the structure of the document, where the structure meta data indicates that the at least one portion is an inner sub portion of an outer portion of the document; and
grant the accessor access to the at least one portion according to the access behavior, where granting the accessor access further comprises:
allowing the accessor to access the inner sub portion; and
preventing the accessor from accessing the outer portion.

28. The product of claim 27, where access to the at least one portion of the electronic document is provided only through an access layer comprising the instructions to receive a request, request authorization, receive from the expert system authorization information, and grant the accessor access.

29. The product of claim 27, wherein the instructions are further operable to:
receive an event raised by the document or raised by the runtime representation, where the event is triggered by a change of the document;
cause the expert system to determine an updated access behavior in accordance with the change; and
notify at least one of the document and the runtime representation about the updated access behavior.

30. The product of claim 27, wherein the instructions are further operable to:
change the rule set and affecting substantially simultaneously the access behavior to the at least one portion without the need to change the document or the accessor.

* * * * *